United States Patent [19]
Morales

[11] 3,767,134
[45] Oct. 23, 1973

[54] ELECTRICAL SENSOR UNIT FOR A SAFETY BELT RETRACTOR

[75] Inventor: Gerald A. Morales, Simi, Calif.

[73] Assignee: American Safety Equipment Corporation, Encino, Calif.

[22] Filed: June 30, 1971

[21] Appl. No.: 158,285

[52] U.S. Cl. .................................. 242/107 SB, 200/61.58 SB, 280/150 SB

[51] Int. Cl. ........................................... A62b 35/00

[58] Field of Search ...................... 242/107, 107 SB, 242/107.1, 107.11, 107.2, 107.4, 107.5; 297/388, 389; 280/150 SB; 200/61.58 SB, 61.59, 61.67, 61.68; 340/52

[56] References Cited
UNITED STATES PATENTS

| | | | |
|---|---|---|---|
| 3,371,736 | 3/1968 | Lewis et al. | 242/107 SB |
| 3,375,495 | 3/1968 | Burns | 200/61.58 B |
| 3,381,268 | 4/1968 | Boblitz | 340/52 |
| 3,519,771 | 7/1970 | Bums | 200/61.58 B |
| 3,504,336 | 3/1970 | Boblitz | 340/52 |

Primary Examiner—Werner H. Schroeder
Attorney—Miketta, Glenny, Poms & Smith

[57] ABSTRACT

The electrical sensor unit for mounting on a conventional safety belt retractor to provide an electrical signal to a "Fasten Safety Belts" light and to a "Safety Belts Fastened" light of a vehicle warning system includes a housing for location on the retractor over the nut on the axle of the belt reel; a hub adapter rotatably mounted in the housing coaxially of the belt reel, with a cavity on the inner end thereof mating with the reel axle nut, and with a gear on the outer end thereof; a ring gear cam rotatably mounted in the housing for rotation about an axis parallel to and spaced from the reel axis to mesh with the hub gear, said ring gear cam having a curved ridge adjacent part of its circumference; an actuator slidably mounted in the housing with the lower end thereof engageable by the surface of the cam ridge to be slid thereby into a raised position; and normally open and normally closed contacts mounted in the housing, electrically connected to the lights, and engageable by the upper end of the actuator to be moved thereby to the other positions to signal, in response to the extension and retraction of the belt, whether or not the safety belt is buckled.

23 Claims, 8 Drawing Figures

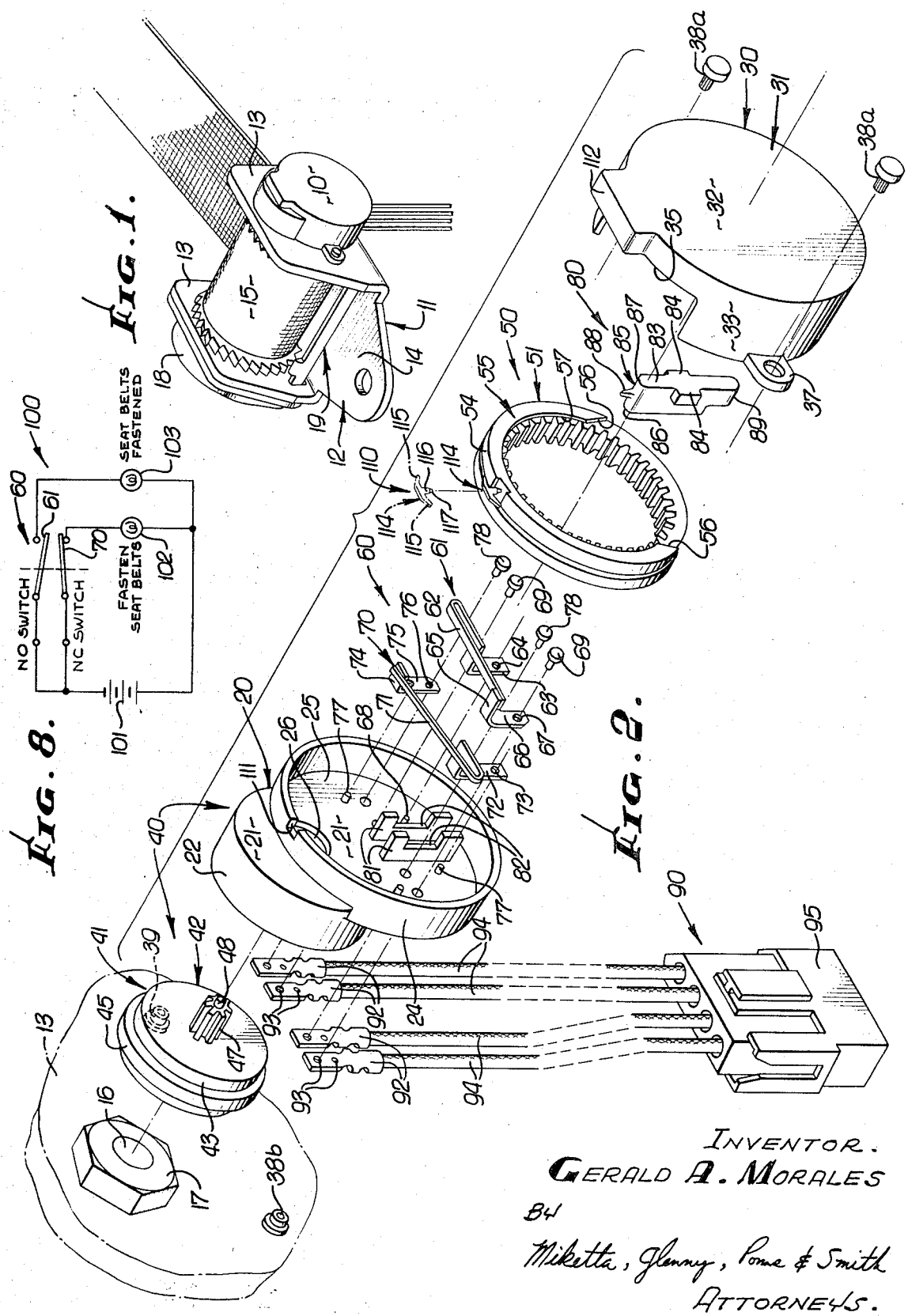

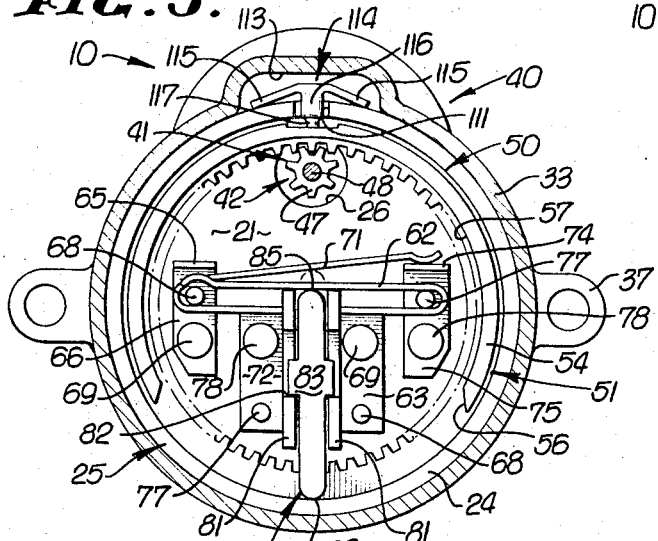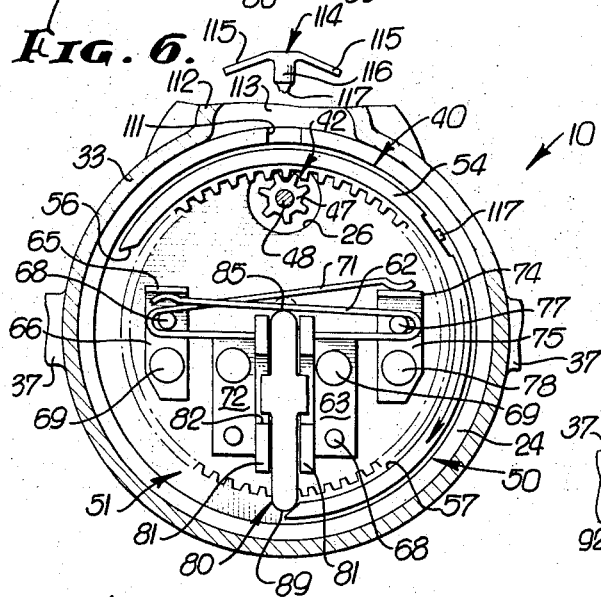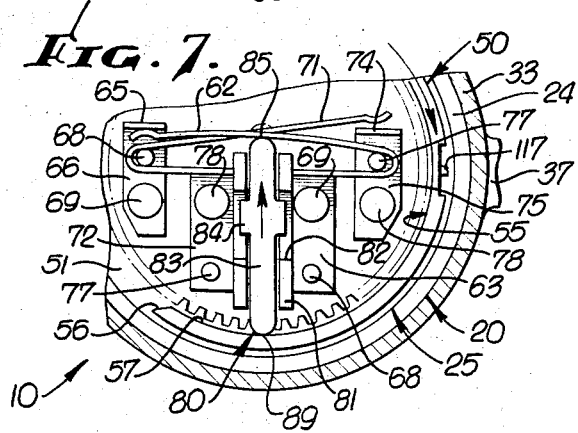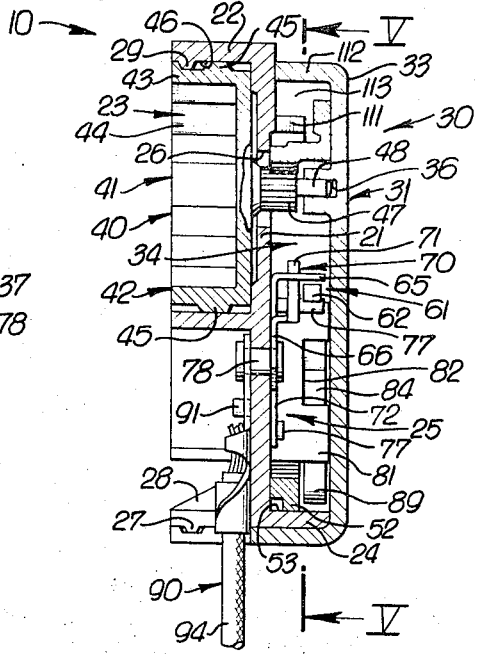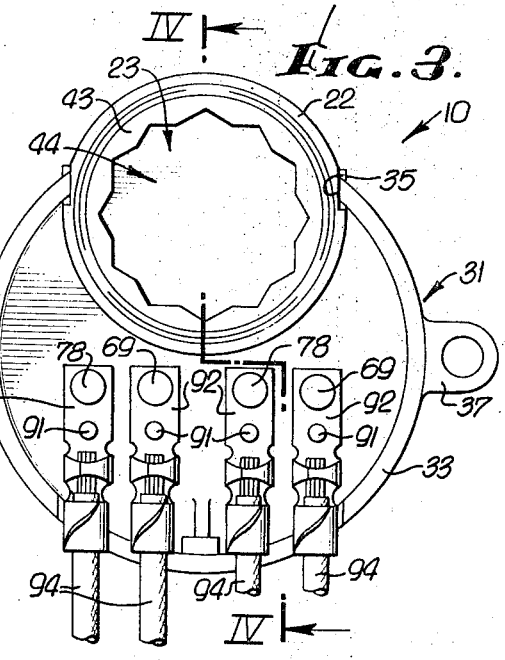

ELECTRICAL SENSOR UNIT FOR A SAFETY BELT RETRACTOR

BACKGROUND OF THE INVENTION

This invention relates to safety belt retractors and more particularly to a sensor unit for such a retractor which may be electrically connected to a vehicle warning system.

The law requires that safety belts be installed in all new cars and trucks to protect the occupants of the vehicles against injury in the event of an accident. However, these safety belts provide no protection unless the occupants wear them, and unfortunately many times the occupants neglect to "buckle up."

In order to remind the occupants of a vehicle to fasten their seat belt, warning systems have been devised which flash lights, operate buzzers, or even cut out the ignition circuit of the vehicle until the seat belts are fastened. Such systems require some means of sensing when the belts are being used and when the belts are not being used. Prior art sensor means have included the provision of wires through the belt halves which are connected by buckling the belt halves together (see Hood, U.S. Pat. No. 3,133,277), the provision of belt tension actuated switches which are opened when the halves are buckled together (see Erikson, U.S. Pat. No. 3,226,674) and the provision of specially constructed retractor mechanism which close switches upon withdrawal of the belt (see Lewis et al., U.S. Pat. No. 3,371,736). The most practical of the prior art sensor means are the retractor related ones, but their major drawback has been that they required special adaptation of the retractor itself. The Lewis patent for example, shows a safety belt system including such a specially constructed retractor with an axially extended, threaded belt reel end along which a switch actuating, threaded follower moves in response to extension of the belt to close a switch in the ignition circuit to permit the engine to be started. Besides requiring a specially designed retractor, the sensor means of the Lewis patent makes the retractor too long for installation in many vehicles.

Safety belt retractors have reached a level of design where it would be desirable to adapt the sensor means to existing retractor with the sensor means so adapted being very compact.

BRIEF DESCRIPTION OF THE INVENTION

Therefore, it is the primary object of this invention to provide an electrical sensor unit which is adapted to be mounted on an existing safety belt retractor and which connects to a warning system to indicate whether or not the belt is being used.

Other and additional objects of this invention are to provide such an electrical sensor unit which is compact when mounted to the retractor, which requires a minimum of design changes in the retractor, which is positively and correspondingly driven by the extension and retraction of the belt, which is easily oriented with the position of the belt in the retractor, which will provide one or more electrical signals to the warning system, which energizes one part of the warning system before another part thereof is deenergized and which is economical to manufacture, easy to install and dependable in operation.

Generally stated the electrical sensor unit for a safety belt retractor to provide an electrical signal indicating the position of the belt according to the present invention includes an operating means operatively associated with the belt reel of the retractor to be rotatively driven thereby in response to extension and retraction of the belt, said operating means having a camming surface rotating about an axis spaced from the axis of the belt reel; and switch means mounted to the frame of the retractor for being engaged by the camming surface of the operating means in certain rotative positions thereof and being spaced from the camming surface thereof in other rotative positions thereof to provide the electrical signal. The switch means may include normally open contacts, normally closed contacts or both as well as actuator means for engagement by the camming surface upon extension of the belt to move the contacts to the other position. The operating means may include a driver member and a driven member engaging the driver member and carrying the camming surface. The parts may all be located and held in a housing which in turn is easily mounted to an already assembled retractor by novel mounting means. The retractor with the sensor unit may be mounted in a vehicle having a dual light warning system and the sensor unit may have a "make before break" switch means for the dual light warning system.

BRIEF DESCRIPTION OF THE DRAWINGS

FIG. 1 is a perspective view of the sensor unit, according to this invention, mounted on a conventional seat belt retractor;

FIG. 2 is an enlarged, exploded perspective view of the sensor unit of FIG. 1;

FIG. 3 is an enlarged elevational view of the end of the sensor unit of FIG. 1 facing the retractor;

FIG. 4 is a cross-sectional view of the unit of FIG. 3 taken therein along the plane IV—IV;

FIG. 5 is an elevational view, partially in section, of the unit of FIG. 4 taken therein along the plane V—V showing the camming surface thereof in a position corresponding to the retracted position of the belt and showing the electrical contacts of the unit in their normal positions;

FIG. 6 is a view similar to FIG. 5 but showing the camming surface thereof rotated to an intermediate position with the normally open contacts moved to the closed position while the normally closed contacts remain in the closed position;

FIG. 7 is a view similar to FIG. 5 and 6 but showing the camming surface thereof rotated to a position corresponding to the extended position of the belt and showing each of the contacts of the unit moved to their other positions;

FIG. 8 is a schematic wiring diagram of a portion of a vehicle electrical system which comprises a vehicle warning system, with which the sensor unit, according to this invention, may be used.

DETAILED DESCRIPTION OF THE PREFERRED EMBODIMENT

Referring now to the drawings and particularly to FIG. 1, the electrical sensor unit according to this invention, is generally denoted by the number 10. The electrical sensor unit 10 is shown mounted to an illustrative conventional safety belt retractor 11 such as in required in every newly manufactured automobile or truck for use in the United States. The retractor 11 includes a frame 12 with apertured sidewalls 13 and a web 14 with a hole therein through which a conventional bolt is passed in mounting the retractor 11 to the vehicle. A belt reel 15 with the safety belt strap wound therearound is located between the sidewalls 13 and has an axle 16 extending through the apertures on the sidewalls 13 to rotatably mount the reel 15 therebetween. Conventional hexagonal nuts 17 are turned onto the axle ends to maintain the axle 16 on the sidewalls 13. The retractor 11 also typically has a biasing means 18 for biasing the safety belt to the retracted position, i.e., wound upon the reel 15, and has locking means 19 for locking the belt after the belt is fastened around the occupants of the vehicle. There are, of course, a great many designs of safety belt retractors and the sensor unit is adaptable for use with most of these designs. The retractor 11 shown is meant to be illustrative of all of these retractors and is not itself part of this invention.

Generally, the electrical sensor unit 10, according to this invention, for providing an electrical signal indicating the position of a safety belt, includes a housing 20 thereover and adapted for mounting to the frame 11; mounting means 30 mounting the housing 20 to the retractor 11; operating means 40 such as a driver means 41 and a driven means 50, rotatably mounted in the housing 20 and having a camming surface 55 for rotation about an axis spaced from the reel axis; switch means 60 including either normally open contacts 61 or normally closed contacts 70 or both and an actuator means 80 for being engaged by the camming surface 55 to operate the switch means 60 to provide the electrical signal. The retractor 11, with the sensor unit 10, according to this invention, having connector means 90, may be mounted to a vehicle having warning system 100 with the connector means 90 connecting the sensor unit 10 to the warning system 100. Holding means 110 may be provided in the assembly of the unit 10 for holding the operating means 40 in a fixed position until the housing 20 is installed on the retractor 11 to obtain correspondence in the positions of the parts thereof.

Referring now primarily to FIG. 2, the sensor unit 10 includes a supporting structure for mounting the parts to the retractor frame 12 which is, illustratively, a housing 20. The housing 20 has a transverse middle wall 21 from which a cylindrical wall 22 extends towards the retractor 11 to define a retractor facing cavity 23 centered on the reel axis, and from which an opposite cylindrical wall 24 extends away from the retractor 11 to define an oppositely facing cavity 25 about an axis parallel to but spaced from the reel axis. The housing 20 has an aperture 26 through the middle wall 21 along the reel axis to provide a passage between the cavities 23 and 25 for a purpose which will appear later. A circumferential rib 27 (see FIG. 4) on an extension 28 of the cylindrical wall 24 and three equally spaced, inwardly facing shoulders 29 in the cylindrical wall 22, are provided for a purpose which will appear later.

The supporting structure of the sensor unit 10 also includes mounting means 30 for mounting the housing 20, and the parts mounted thereto, to the retractor 11, which in the illustrated retractor will be readily completely assembled. The mounting means 30 shown includes a cap 31 having an end wall 32 and a circumferentially grooved cylindrical wall 33, which together define a retractor facing cavity 34 sized to receive the housing 20 therein. A cutout 35 is provided in the cylindrical wall 33 where needed. A raised boss having a closed bore 36 (as seen in FIG. 4) is provided in the end wall 32 along the reel axis for a purpose which will appear later. The cylindrical wall 33 has apertured tabs 37 formed therein for receiving fasteners 38a therethrough which will extend into mating features 38b in the sidewall 13 of the frame 12 for mounting the cap 31 over the housing 20 to the retractor 11. A locating pin 39 is provided for initially locating the cap on the sidewall 13 of the retractor 11 while the fasteners 38 are being mated.

The operating means 40 of the sensor unit 10 are operatively associated with the belt reel 15 to be rotatively driven thereby in response to extension and retraction of the belt to operate the switch means 60. The operating means 40, as best seen in FIG. 2, includes both a driver means 41 rotatively driven by the belt reel 15 and a driven means 50 drivingly engaged by the driver means 41. The driver means 41 of the illustrative embodiment is a hub adapter 42 which has a cylinder 43 at the retractor end thereof. The cylinder 43, as best seen in FIG. 3, has a female cavity 44 which is provided with flats for mating with the flats on the nut 17 on the axle 16 to spline the two together. Returning to FIG. 2, the circumference of the cylinder 43 is provided with a bearing ridge 45 which rides on inner surface 46 in the cylindrical wall 22 to centrally locate the cylinder 43 in the retractor facing cavity 23 for rotation therein. A gear 47 extends from the end of the cylinder 43 and is coaxial therewith. The gear 47 extends through the aperture 26 in the middle wall 21 of the housing 20 to be located in the oppositely facing cavity 25. A pin 48 extends coaxially from the gear 47 into the closed bore 36, as best seen in FIG. 4, to rotatably mount the opposite end of the hub adapter 42 to the cap 31.

A driven means 50 of the illustrative embodiment is a ring gear cam 51 with internal teeth for meshing with the teeth of the gear 47. A ridge 52 extends about the circumference of the ring gear cam 51 and mates with the inner surface 53 in the cylindrical wall 24 of the housing 20 to locate and rotatably mount the ring gear cam 51 in the oppositely facing cavity 25 for rotation about an axis spaced from the axis of the reel 15. The ring gear 51 has a curved ridge 54 in a face thereof which provides a camming surface 55 for operating the switch means 60. The camming surface 55 includes a ramp portion 56 on either end thereof and a curved portion 57 between the ramp portions 56 thereof. The driven means 50 is for operating the switch means 60 upon rotation thereof by the driver means 41.

The switch means 60 of the sensor unit 10 is actuated by the operated means 40 when the latter is in certain relatively rotated positions thereof to provide the electrical signal to the warning system 100. The switch means 60 is illustratively shown as having both normally open contacts 61 and normally closed contacts 70 but because of the versatility of the switch means 60 of this invention they could be provided with either contacts 61 or 70 without any modifications to the sensor unit 10 itself.

As best seen in FIG. 2, the normally open contacts 61 include a return bent leaf spring 62 with a mounting flange 63 having holes 64. The normally open contacts 61 also include a seat 65 with a mounting flange 66 having holes 67. The middle wall 21 of the housing 20 has protrusions 68 on which the flanges 63 and 66 are located to receive rivets 69 therethrough to mount the leaf spring 62 and seat 65 to the housing 20 with the relationship as shown in FIG. 5. In FIG. 5, the end of the leaf spring 62 is spaced from the seat 65 to provide the normally open contacts 61.

The normally closed contacts 70 are quite similarly constructed to the construction of the normally open contacts 60 and include a return bent leaf spring 71 with a mounting flange 72 with holes 73. The seat 74 has a mounting flange 75 with holes 76. Again the middle wall 21 of the housing 20 has protrusions 77 on which the flanges 72 and 75 are located to receive rivets 78 therethrough. In FIG. 5, the end of the leaf spring 71 engages the seat 75 to provide the normally closed contacts 70. Both the normally open and normally closed contacts 60 and 70 are moved from their normal position to their other position by contact actuator means and means mounting the contact actuator means 80.

The contact actuator means and means mounting the contact actuator means 80 are part of the switch means 60 and are for moving the contacts 61 and 70 from their normal position to their other position. As best seen in FIG. 2, the means 80 illustratively includes a spaced pair of vertical walls 81 extending from the middle wall 21 of the housing 20. The vertical walls 81 have notches 82 in the outer surface thereof. An actuator 82 is elongated and has tabs 84 which are located in the notches 82 to limit the vertical movement of the actuator 83 between a lowered position and raised position. The actuator 83 has an upper end 85 with an inner or normally closed contact portion 86 and an outer or normally open contact portion 87 with a wall 88 therebetween. The actuator 83 has a lower end 89, as seen in FIG. 5, which is spaced from the camming surface 55 of the operating means 40 in certain rotative positions thereof to permit the contacts 61 and 71 to remain in their normal positions; which, as seen in FIG. 6, is engaged by the ramp portion 56 of the camming surface 55 in certain rotative position thereof; first to move the normally open contact 61 to the closed position and then to move the normally closed contact 70 to the open position thereof while holding the normally open contact 61 in the closed position; and finally, which as seen in FIG. 7, is engaged by the curved portion 57 of the camming surface 55 in certain rotative positions thereof to hold the contacts 61 and 70 in the other positions. This movement provides the electrical signals carried by connecting means 90.

The connecting means 90 of the sensor unit 10 are for electrically connecting the unit 10 to a warning system 100. As best seen in FIGS. 2 and 3 the electrical connecting means 90 include protrusions 91 from the middle wall 21 of the housing 20 which extend into the retractor facing cavity 23 to receive thereon wire terminals 92 having holes 93. The rivets 69 and 78 also extend through the holes 93 to electrically connect the terminals 92 to respective normally open and normally closed contacts 61 and 70. Each terminal 92 is mounted on one end of wire 94, the other end of which is mounted in a socket 95 which is easily connected to the warning system 100.

The warning system 100 is diagrammatically shown in FIG. 8 and includes a battery or other source of electrical energy 101 which will typically be a vehicle battery. One terminal of the battery 101 will be connected to the sensor unit 10 and the other terminal will be connected to a pair of lights 102 and 103 by wires 104. The light or other signaling device 102 in some manner indicates fasten safety belts and the other light or other signaling device 103 indicates safety belts fastened. The lights 102 and 103 are connected by wires 104 to the normally closed contacts 70 and the normally open contacts 61 respectfully so that light 102 signals "Fasten Safety Belts" until the safety belts are fastened whereupon the sensor unit 10 causes the light 103 to signal "Safety Belts Fastened."

The sensor unit 10 of the illustrated embodiment, being a complete subassembly which is mounted to the retractor 11 after both are assembled, needs holding means 110 for holding the operating means 40 in a predetermined position for mounting to the already assembled retractor 11. Illustratively, the holding means 110 includes a hold 111 in the cylindrical wall 24 of the housing 20 and walls 112 in the cap 31 which define a head space 113 as best seen in FIG. 5. The ring gear cam 51 is provided with a tree 114 which has opposed spring arms 115 extending outwardly from a trunk 116 with a break-off notch 117 at the juncture of the trunk with the ring gear 51. When the ring gear cam 51 is initially positioned in the housing 20, the tree 114 extends into the head space 113 through the hole 111 to prevent rotation of the ring gear cam 51 in turn holding the positions of the hub adapter 42 and the switch means 60.

It is contemplated that the illustrative sensor unit 10 will be assembled as a complete subassembled retractor 11, though by simple changes in the design of the sensor unit 10, without departing from the scope of this invention, the sensor unit 10 could be assembled with the assembly of the retractor 11. To assemble the sensor unit, the terminals 92 attached to the wires 94 from the socket 95; the leaf springs 62 and 71; and the seats 65 and 74 are placed on the protrusions 91, 68, and 77 of the middle wall 21 of the housing 20 with the rivets 69 and 78 securing these parts thereto. Next the ring gear cam 51 is inserted into the oppositely facing cavity 23 of the housing 20 with the tree 114 thereon extending through hole 111 to properly initially locate the camming surface 55. The actuator 83 is inserted between the spaced walls 81 with the tabs 84 located in the notches 82 of the walls 81. Next, the housing 20, with the parts mounted thereon, is inserted into the retractor facing cavity 34 of the cap 31 until the rib 27 snaps into the groove in the wall 33 to retain the parts in the space between the cap 31 and the housing 20. The hub adapter 42 is now inserted into the retractor facing cavity with the gear 47 thereof extending through the aperture 26 to mesh with the ring gear cam 51, and with the pin 48 extending into the bore 36 in the cap 31. While being inserted, the circumferential ridge 45 snaps behind the shoulders 29 to ride on the inner surface 46. The subassembly of the sensor unit 10 is now complete, ready to be mounted to the retractor 11.

To mount the sensor unit 10 to the retractor 11, the sensor unit is positioned adjacent the sidewall 13 to enable the female cavity 44 of the hub adapter 42 to be telescoped over the nut 16 in splined relationship thereto to be driven thereby. When the sensor unit 10 is flush against the sidewalls 13, the locating pin 39 will properly locate the unit 10 on the retractor 11 while the fastener 38a is inserted through the apertured tabs 37 and into the mating fasteners 38b of the sidewall 13 to secure the sensor unit 10 to the retractor 11. The retractor 11 is now ready to be mounted in a vehicle with the sensor unit 10 thereof electrically connected via socket 95 to the vehicle warning system 100.

The operation of the sensor unit 10 is best illustrated by referring successively to FIGS. 5, 6 and 7. In FIG. 5, the sensor unit 10 is shown as initially assembled with the camming surface 55 of the ring gear cam 51 in the belt retracted position; with the actuator 83 in the lowered position with the lower end 89 against the housing 20; and with the normally closed contact 70 and the normally open contact 61 in their normal positions. The normally closed contacts 70 electrically connect the "Fasten Seat Belts" light 102 across the battery 101 to remind the occupants of the vehicle to "buckle up."

As the occupant pulls the belt from the retractor 11 to "buckle up," the reel 15 rotates, rotating the axle 16 and nut 17 to drive the hub adapter 42. The gear 47 of the hub adapter 42 drives the ring gear cam 51 to rotate it from the position shown in FIG. 5 to the position shown in FIG. 6. As the ring gear 51 leaves the position shown in FIG. 5, the tree 114 is separated from the ring gear 51 at the notch 117 whereupon the spring arms 115 raise the trunk 116 out of the cavity 25 and into the head space 113 where the tree 114 remains out of the way. As the ring gear cam 51 approaches the position shown in FIG. 6, the ramp portion 56 of the camming surface 55 engages the lower end 89 of the actuator 83 and raises it to the position of FIG. 6. In the meantime, the normally open contact portion 87 of the upper end 85 engages the leaf spring 62 to raise it against the seat 65 to close the normally open contact 61 and thereby electrically connect the "Safety Belts Fastened" light 103 across the battery 101 to show that the safety belts are fastened. Continued extension of the belt to the actual fastening position, rotates the ring gear cam 51 past the position shown in FIG. 6 and into the position of FIG. 7. As the ring gear cam 51 passes the position of FIG. 6, the ramp surface 56 raises the lower end 89 of the actuator 83 onto the curved portion 57. The upper end 85 of the actuator 83 also raises, whereupon the normally closed contact portion 86 engages the leaf spring 71 to raise it away from the seat 74 and disconnect the "Fasten Safety Belt" light 102 from across the battery 101, leaving only the "Safety Belts Fastened" light 103 on. As long as the safety belts are fastened, the light 103 will remain on.

When the safety belt is released, the biasing means 18 rotates the reel 15 oppositely to rotate the ring gear cam 51 from the position of FIG. 7, through the position of FIG. 6 to the position of FIG. 5. The actuator 83 is moved from the raised position to the lowered position by the spring action of the leaf springs 62 and 71 acting against the upper end 85 while the lower end 89 moves along the curved portion 57 and down the ramp portion 56 and away from the camming surface 55. The leaf spring 71 returns to the seat 74 to energize the "Fasten Safety Belts" light 102 before the leaf spring 62 leaves the seat 65 to disconnect the "Safety Belts Fastened" light 103 from across the battery 101.

It should be noted that the switch means 60 of the sensor unit 10 of this invention always provides a "make before break" switch action. Another advantage of the sensor unit 10 of this invention, is that only one of the contacts 61 and 70 may be used if the particular vehicle warning system 100, so requires, and it can be either, the normally open contacts 61 or the normally closed contacts 70 depending upon the requirements of the particular warning system 100. If so desired, the extra contacts could be omitted from the sensor unit 10 together with their related parts, but it will probably be more economical for such uses to provide the sensor unit with both contacts 61 and 70 and then only use the require set.

Thus, the sensor unit 10 according to this invention is adapted to mount to an existing safety belt retractor and is adapted for connection to a vehicle warning system to remind the occupants to use their safety belts as well as indicating that the seat belts are being used.

I claim:

1. An electrical sensor unit for a conventional safety belt retractor to provide an electrical signal indicating the position of the belt, said retractor having a frame and a belt mounting reel rotatably mounted thereto about an axis, said sensor unit comprising:

switch means associated with an electrical signal producing means;

camming means associated with said switch means and means for mounting said camming means for rotation about a fixed axis for actuating said switch means when said camming means is in certain rotative positions thereof; and gear drive means including a drive gear associated with the belt reel and a driven gear associated with the camming means for rotating said camming means on its mounting means in response to rotation of said reel upon extension and retraction of the belt.

2. An electrical sensor unit for a conventional safety belt retractor to provide an electrical signal indicating the position of the belt, said retractor having a frame and a belt mounting reel rotatably mounted thereto about an axis, said sensor unit comprising:

switch means associated with an electrical signal producing means;

camming means associated with said switch means for actuating said switch means when said camming means is in certain rotative positions thereof; and operating means associated with the belt reel for rotating said camming means in response to rotation of said reel upon extension and retraction of the belt, wherein the switch means includes:

a pair of normally open contacts and a pair of normally closed contacts for movement between open and closed positions, and a contact actuator means and means for movably mounting the actuator means for engagement by the camming surface upon extension of the belt to move the contacts from their normally open and normally closed positions to the closed and opened positions, respectively, retraction of the belt returning the camming means to return the contacts via said contact actuator means to their normal positions.

3. The invention as in claim 2 wherein the retractor frame is mounted to a vehicle having warning system with two indicators, one indicator signaling that the safety belt is not fastened and the other indicator signaling that the safety belt is fastened, said one indicator being connected to the normally closed contacts and said other indicator being connected to the normally open contacts whereby when the safety belt is retracted, the one indicator signals and when the safety belt is extended, the other indicator signals.

4. The invention as in claim 2 wherein the means for movably mounting the contact actuator means mounts the latter relative to said pair of normally open contacts and said pair of normally closed contacts so that one of said pair of contacts is engaged by said actuator means prior to the other upon movement of said actuator means whereby upon extension of the belt, one of said pair of contacts is actuated prior to the other.

5. An electrical sensor unit for a conventional safety belt retractor to provide an electrical signal indicating the position of the belt, said retractor having a frame and a belt mounting reel rotatably mounted thereto about an axis, said sensor unit comprising:
switch means associated with an electrical signal producing means;
camming means associated with said switch means for actuating said switch means when said camming means is in certain rotative positions thereof; and
operating means associated with the belt reel for rotating said camming means in response to rotation of said reel upon extension and retraction of the belt, wherein the operating means includes a drive means rotatively driven by the belt reel and includes a driven means, said driven means drivingly engaging the driver means and having thereon the camming means whereby rotation of the belt reel rotates the camming means between rotative positions to operate the switch means, wherein the driver means is a gear, and wherein the driven means is a gear meshing with the driver means gear.

6. The invention as in claim 1 wherein the camming means includes a ramp portion for initially engaging the switch means and for moving the switch means upon engagement therewith to an actuated position, and a curved portion joined to the ramp portion for maintaining the switching means said position.

7. The invention as in claim 6 wherein the switch means includes contacts movable between a normal position and an actuated position and actuating means for moving the contacts, said actuating means having a portion thereof located for engagement by the camming means, said portion being initially engaged by the ramp portion to be moved thereby to move the contacts from the normal position to the actuated position and then engaged by the curved surface to maintain the contacts in the actuated position.

8. The invention as in claim 1 wherein said sensor unit is provided with supporting structure mounted to the retractor frame which includes means for mounting the operating means and switch means to said retractor frame.

9. The invention as in claim 8 wherein the belt reel has an axle extending through one sidewall of the frame, wherein the supporting structure includes a housing and means are provided for mounting the housing on the sidewall over a portion of said axle extending through said one sidewall of the frame.

10. The invention as in claim 9 wherein the operating means includes a driver means associated with the axle to be rotatively driven thereby and includes a driven means rotatively mounted in the housing for being drivenly engaged by the driver means and wherein the camming means is mounted on said driven means whereby rotation of the belt reel rotates the camming means between rotated positions to operate the switch means.

11. The invention as in claim 9 wherein the operating means includes a driver means, and wherein the reel axle and the driver means have mating male and female ends to lock the two together for corresponding rotation.

12. The invention as in claim 11 wherein the reel axle has a nut on the end thereof, and wherein the driver means has a mating cavity in the end thereof.

13. The invention as in claim 9 wherein the operating means and the switch means are movably mounted to the housing, said operating means engaging the axle upon the mounting of the housing to the sidewall by the mounting means.

14. An electrical sensor unit for installation on an already assembled conventional safety belt retractor to provide an electrical signal indicating the position of the safety belt, said retractor having a frame and a belt mounting reel with an axle extending through at least one sidewall of the frame, said sensor unit comprising:
a hollow housing suitably shaped for location to the one sidewall over the axle,
an operating means movably mounted in the housing for engaging the axle to be correspondingly driven by the axle upon rotation of the reel due to extension and retraction of the belt,
switch means mounted in the housing for being operated by the operating means upon movement thereof to provide the electrical signal, and
mounting means for mounting the housing, with the operating means and the switch means already mounted therein, on the sidewalls over the axle with the operating means engaging the axle to be driven thereby.

15. The invention as in claim 14 wherein:
a first spline member is fixedly provided on said reel axle exteriorly of said frame one sidewall and
said operating means for engaging the axle includes a second spline member, said first and second spline members being interfitted to each other upon mounting of the housing to said one sidewall for driving said operating means by said reel axle upon rotation of said reel.

16. The invention as in claim 14 wherein the reel axle has a nut adjacent the sidewall and wherein the operating means includes a driver means having a mating cavity, said nut being received in said cavity when said housing is mounted to the retractor to be driven thereby.

17. The invention as in claim 14 wherein the switch means includes an actuating means located spaced from the axis of the reel and wherein the operating means includes a driver means rotatably mounted in the housing for engaging the axle and includes driven means movably mounted in the housing radially of and in association with the driver means, to move the actuating means and thereby operate the switch means.

18. The invention as in claim 17 wherein the driven means includes a hub adapter rotatably mounted in the housing coaxial with the reel, when the housing is mounted to the frame, with one end engaging the reel axle and the other end provided with a gear; wherein the driven means is an toothed gear cam rotatably mounted in the housing for rotational movement about an axis parallel to and spaced from the reel axis to mesh with the hub adaptor gear and to be located adjacent the end of the switch means actuator, said gear cam having a curved ridge with a camming surface for engaging the end of the actuator in certain rotative positions of the gear cam to move the actuator, and for being spaced from the end of the actuator in certain other rotative positions.

19. The invention as in claim 14 wherein the switch means includes
    a pair of normally closed contacts mounted in the housing for movement between closed and open positions, and
    a contact actuator means and means for movably mounting the actuator means in the housing for engagement by the camming surface upon extension of the belt to separate the normally closed contacts, retraction of the belt returning the camming means to return the contacts to the closed position.

20. The invention as in claim 14 wherein the switch means includes
    a pair of normally open contacts mounted in the housing for movement between open and closed positions, and
    a contact actuator means and means for movably mounting the actuator means in the housing for engagement by the camming surface upon extension of the belt to move the normally open contacts to the closed position, retraction of the belt returning the camming surface to return the contacts to the closed position.

21. The invention as in claim 14 wherein the switch means includes
    a pair of normally open contacts and a pair of normally closed contacts, mounted in the housing for movement between open and closed positions, and
    a contact actuator means and means for movably mounting the actuator means in the housing for engagement by the camming surface upon extension of the belt to move the contacts from the normal position to the other position, retraction of the belt returning the camming means to return the contacts to the normal position.

22. The invention as in claim 20 wherein the retractor frame is mounted to a vehicle having warning system with two indicators, one indicator signaling that the safety belt is not fastened and the other indicator signaling that the safety belt is fastened, said one indicator being connected to the normally closed contacts and said other indicator being connected to the normally open contacts whereby when the safety belt is retracted, the one indicator signals and when the safety belt is extended the other indicator signals.

23. The invention as in claim 14 additionally comprising holding means for holding the operating means in a predetermined position before the housing is mounted to the retractor by the mounting means, said holding means being for obtaining correspondence between the belt and the operating means, and for releasing the operating means upon the initial extension of the belt after the mounting of the housing on the retractor.

* * * * *